(12) United States Patent
Chomik et al.

(10) Patent No.: US 8,614,620 B2
(45) Date of Patent: Dec. 24, 2013

(54) METHOD FOR PARAMETERIZING A PROCESS AUTOMATION FIELD DEVICE BY SIMULATING THE ACYCLIC SERVICES

(75) Inventors: Alain Chomik, Pulversheim (FR); Udo Fuchs, Waldshut-Tiengen (DE); Pierre Harnist, Bartenheim (FR)

(73) Assignee: Endress + Hauser Flowtec AG, Reinach (CH)

( * ) Notice: Subject to any disclaimer, the term of this patent is extended or adjusted under 35 U.S.C. 154(b) by 1066 days.

(21) Appl. No.: 12/226,532

(22) PCT Filed: Apr. 13, 2007

(86) PCT No.: PCT/EP2007/053604
§ 371 (c)(1),
(2), (4) Date: Mar. 23, 2009

(87) PCT Pub. No.: WO2007/122117
PCT Pub. Date: Nov. 1, 2007

(65) Prior Publication Data
US 2009/0309692 A1 Dec. 17, 2009

(30) Foreign Application Priority Data

Apr. 21, 2006 (DE) .......................... 10 2006 019 192
Nov. 15, 2006 (DE) .......................... 10 2006 054 146

(51) Int. Cl.
*G05B 23/02* (2006.01)
(52) U.S. Cl.
USPC ........... 340/3.5; 340/3.1; 340/3.51; 340/3.52; 340/3.53; 340/3.54; 710/8; 710/62; 710/100; 710/107; 714/44

(58) Field of Classification Search
USPC ............. 709/221, 232, 248; 710/8, 100–125, 710/300–317; 714/1–5, 5.1, 7, 43, 44; 705/52; 700/79, 80, 23; 713/1; 340/3.5, 340/3.51–3.54, 9.1–9.17; 711/200–221
See application file for complete search history.

(56) References Cited

U.S. PATENT DOCUMENTS

2003/0200327 A1* 10/2003 Koellner et al. ............... 709/232
2005/0114577 A1*  5/2005 Beckhoff et al. ............. 710/110

FOREIGN PATENT DOCUMENTS

EP          1 199 846 A1    4/2002

OTHER PUBLICATIONS

Acromag Incorporated, BusWorks 900 PB Series ProfiBus/RS485 Network I/O Modules Technical Reference, Introduction to ProfiBus DP, 2002, pp. 1-47.*
ABB Automation Products GmbH, Controllers for Process Engineering Controllers for Industry, ProfiBus-DP Interface and Module Manual 42/62-5006 EN Rev. 02, Aug. 2002, pp. 1-44.*

* cited by examiner

*Primary Examiner* — Steven Lim
*Assistant Examiner* — Sisay Yacob
(74) *Attorney, Agent, or Firm* — Bacon & Thomas, PLLC

(57) ABSTRACT

In a method for parametering a field device of process automation technology, wherein the field device is connected via a bus system with a control unit, parameter values are packaged in telegrams of cyclic services and transmitted to the field device whose parameter values are to be changed. No acyclic services are required for changing parameter values.

15 Claims, 2 Drawing Sheets

METHOD FOR PARAMETERIZING A PROCESS AUTOMATION FIELD DEVICE BY SIMULATING THE ACYCLIC SERVICES

TECHNICAL FIELD

The invention relates to a method for parametering a process automation technology field device, wherein the field device is connected with a control unit via a bus system and exchanges telegrams with the control unit in cyclic data traffic, the cyclic data traffic serves for reading or writing process data in the field device without address specification.

BACKGROUND DISCUSSION

In process automation technology, field devices are often used, which serve to register and/or influence process variables. Examples of such field devices are fill level measuring devices, mass flow meters, pressure and temperature measuring devices, etc., which, as sensors, register the corresponding process variables, fill level, flow, e.g. flow rate, pressure and temperature, respectively.

Serving for influencing process variables are also field devices in the form of actuators, e.g. valves or pumps, via which flow of a liquid in a pipe section, and/or fill level in a container, can be changed.

In principle, all devices are designated as field devices, which are used near a process and which supply or process process-relevant information.

A large number of such field devices are manufactured and sold by the firm, Endress+Hauser.

As a rule, field devices in modern industrial plants are connected by bus systems (Profibus, Foundation Fieldbus, etc.) with superordinated units (control systems or control units). These superordinated units serve, among other things, for process control, process visualization, process monitoring, as well as for start-up of the field device.

Normally, the superordinated units are control units (e.g. programmable logic controllers, or PLCs). In the bus system (Profibus PA or DP), these control units function as Master Class 1. They are responsible for the cyclic data traffic on the bus system.

For the parametering and diagnosis of field devices, today, as a rule, additionally, service units with corresponding service programs (e.g. PDM of the firm, Siemens, FieldCare of the firm, Endress+Hauser) are deployed, which communicate with the field devices acyclically and function as Master Class 2.

Recently, the Profibus specifications were adapted so that also Master Class 1 units can make use of acyclic services. That means that parametering of field devices is now also possible with control units meeting the new specifications.

At present, in existing applications, almost exclusively, control units of the older generation are to be found, which have no acyclic services. Also in future applications, due to reliability reasons, control units of the older generation are apt still to be used frequently.

In order to be able to use the newly specified, acyclic services, the older control units would have to be replaced with new control units. For this, a shutdown of the plant would be necessary, accompanied by an interruption of the control process. Integration of the new control units could only be accomplished by highly-qualified technical personnel. All these measures would be extremely complex for the user and be tied to substantial costs. The probability that older controls will continue to be used into the future is, therefore, quite high.

SUMMARY OF THE INVENTION

An object of the invention is to provide a method for parametering a field device of process automation technology, which method is simple, cost effective and performable with a control unit exchanging data with the field device only via cyclic services.

The object is achieved by a method comprising the following steps:
packaging address value and associated parameter value into at least one telegram of a cyclic service in the control unit;
transmitting the one or more telegram(s) to the field device;
ascertaining the address value and the associated parameter value from the one or more telegram(s) received in the field device; and
writing the parameter value to a memory address specified by the address value in the field device.

An essential idea of the invention is to send parametering data to field devices via telegrams of cyclic data traffic.

BRIEF DESCRIPTION OF THE DRAWINGS

The invention will now be described in greater detail on the basis of an example of an embodiment presented in the drawing, the figures of which show as follows.

DETAILED DESCRIPTION

Figure 1:
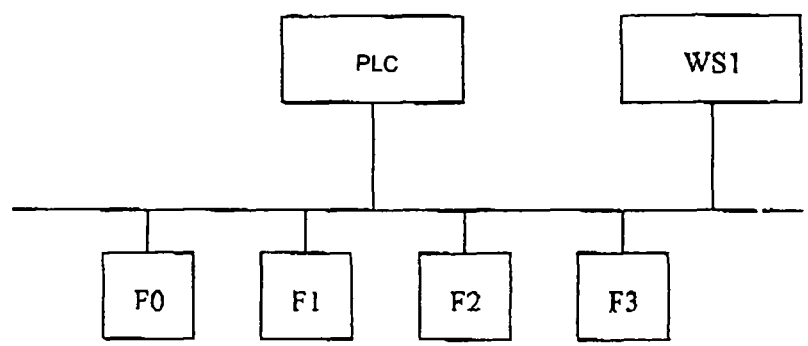
FIG. 1 Profibus-network in schematic representation.

FIG. 1 shows a small Profibus network having three field devices F1, F2, F3, a control unit PLC, and an additional superordinated unit WS1.

As application, protection against overfilling is provided for a tank containing liquid. Field device F1 measures level in a container. Field device F2 is a valve and regulates discharge of liquid from the container. Additionally, field device F3 is provided as a limit-level switch, which senses maximum level in the container.

A control program in the control unit PLC (which can be, for example, a programmable logic controller) controls the level in a container. Control unit PLC is a Profibus master. The field devices F1, F2, F3 are Profibus slaves. Communication between the control unit PLC and the field devices F1, F2, F3 takes place according to known Profibus standards.

Figure 2:
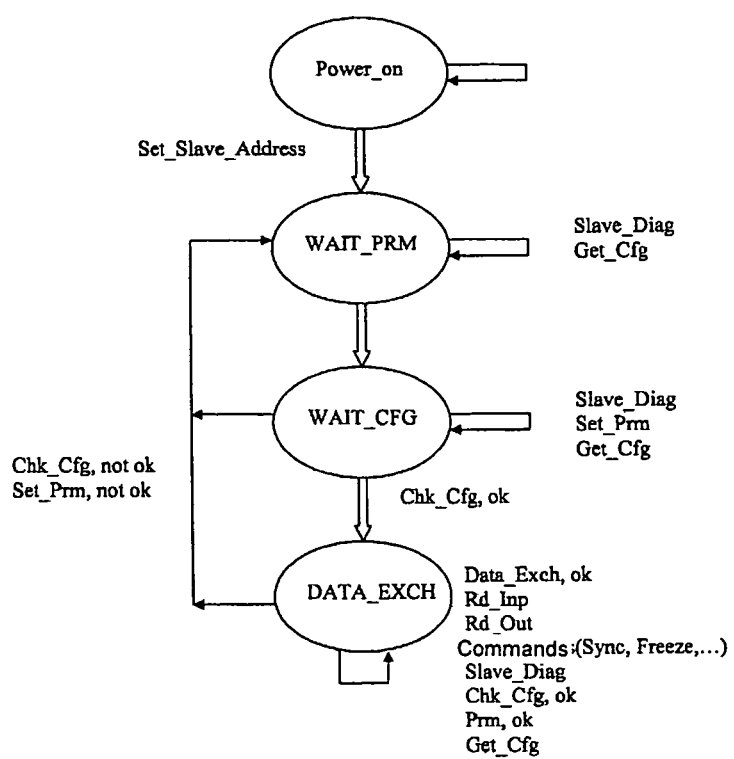
FIG. 2 Profibus state machine for the field device F1 of FIG. 1.

FIG. 2 shows schematically a Profibus state machine for the field device F1. Following turn-on of the voltage supply (state, Power_on), the system transfers into the state, "Waiting for Parametering" (WAIT_PRM). After successful parametering, the system transfers into the state, "Waiting for Configuring" (WAIT_CFG). Following successful configuring, the state, "Data Exchange" (DATA_EXCH) is reached.

After all field devices F1, F2, F3 are in the state, "Data Exchange", they can exchange data cyclically with the control unit PLC.

In the following, first Profibus services will be explained, after which the method of the invention will be described in detail.

Cyclic data exchange between the control unit PLC (Master Class 1) and the field devices F1, F2, F3 (slaves) is accomplished via so-called function blocks, which are implemented in the field devices. The function blocks include, for example, an "Analog Input Block" (AI-block), a "Totalizer Block" (TOT-block) or other, manufacturer-specific, function blocks. These process, for example, the measured variables, volume flow, mass flow, density, as well as temperature, measured by the individual field devices. The results of the processing are made available to the Master Class 1 via AI-blocks (analog input) as 'Input' data.

The Master Class 1 can also write data into a field device with the help of the cyclic data traffic. In such case, "Output" data is involved. Such are processed in the field device in the function blocks, 'Analog Output (AO-block)' or 'Digital Output (DO-block)'. In such case, involved can be any process variables serving as references in the field device. With the help of a DO-block, defined actions can be initiated in the device. Newer field devices of the firm, Endress+Hauser Flowtec AG operate always include an AO-block and a DO-block.

Via acyclic services (Master Classes 1 and 2), all parameters of a field device can be accessed. Defined addresses are associated with the parameters. In the case of Profibus, an address is composed of slot and index.

Additionally, also extensive diagnostic services are available via acyclic services.

An essential idea of the invention is to make use of an AO-block and a DO-block in a field device to mimic the acyclic write access. In such case, all necessary information, such as e.g. address of the parameter, is coded in the AO-block. Using defined control sequences, relevant services can be initiated via the DO-block.

The method of the invention will now be explained in greater detail on the basis of a number of requests, which the master sends to the slave. A request contains, in each case, an AO-region and a DO-region.

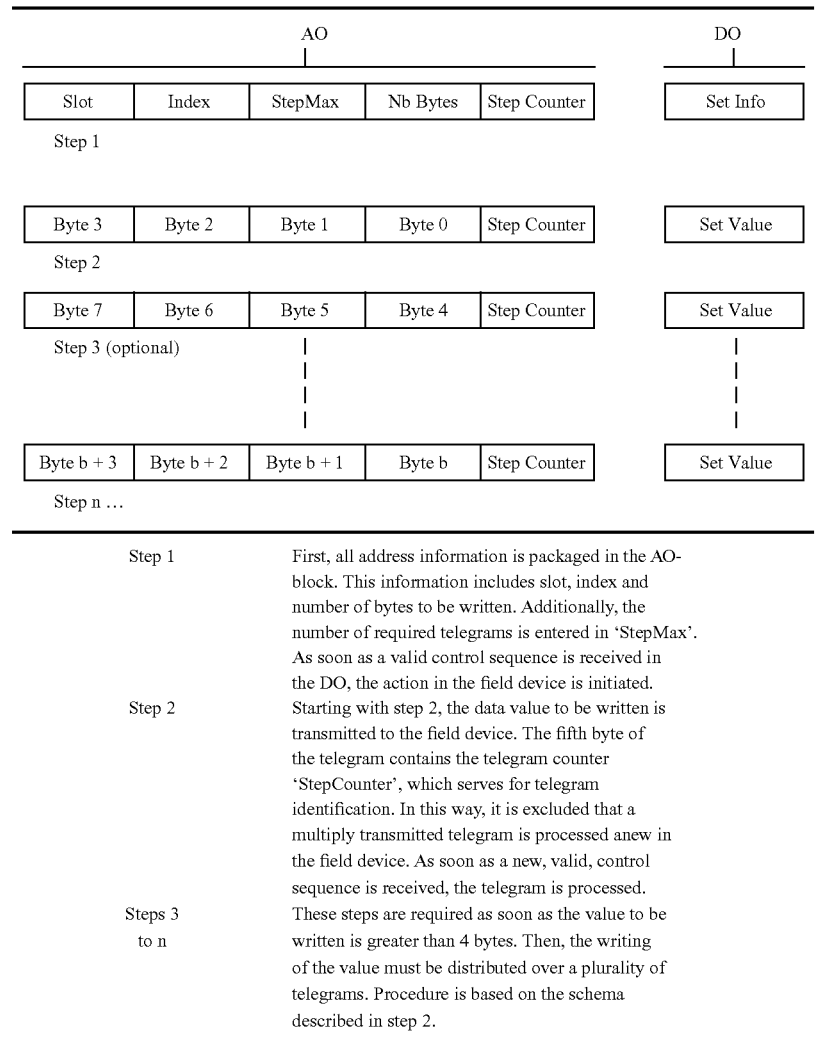

Normally, in cyclic data traffic, process data is read out of the field device or written into the field device, as the case may be. Both accesses occur without address information for the relevant data values.

In the case of the method of the invention, first the address value (slot and index) of the parameter to be changed is packaged in a telegram of cyclic data traffic (e.g. AO-block), with which a process datum is written. This telegram can contain yet further, supplemental information.

Then, the telegram is sent to the field device, e.g. F1, and the AO-block written with the relevant values. In this way, the address value of the parameter value to be changed can be ascertained in the field device F1.

In a following telegram, the parameter value is transmitted to the field device F1 in the corresponding AO-block.

In the field device F1, from these two telegrams, thus the necessary information (address value and new parameter value) can be obtained. Then, the new parameter value is written to the appropriate address.

Address value and parameter value can also be transmitted in separate telegrams (e.g. when more than 4 bytes are to be transmitted).

Also services can be invoked in the field device F1 via cyclic telegrams. This is possible e.g. via the DO-block. A change to 1 means e.g. "Set Info", a change to 2 "Set Value".

In principle, it is sufficient, when one AO- and one DO-module are provided in the field device.

The described method of the invention documents how an acyclic write access can be implemented, with the help of cyclic data communication, by a control unit PLC functioning as Master Class 1.

The acyclic writing is mimicked with the AO and DO blocks in the field device. In the cyclic data exchange, these blocks can be written with defined information and control sequences. The service defined in the AO is initiated in the field device by predefined control sequences in the DO.

In this way, also the Master Class 1 of the older generation can write values for a plurality of parameters present in the field device, i.e. a Master Class 1 of the older generation can effect parameter changes.

The method described to this point functions only when the field device is in the state, "Data Exchange". In order, already at an earlier point in time, to be able to effect a parameter change, it is alternatively provided that two configuration services, Set_Slave_Address (Set_Slave_Add), or Set_Prm, as the case may be, can be utilized for such purpose. These two services, via which, respectively, the changing of the station address and the sending of parameter data are effected, are normally supported by any Profibus device.

In the following, the telegram structure of these two services is shown in greater detail.

Structure of the Set_Prm telegram:

| Station Status | WD_Fact 1 | WD_Fact 2 | Min_Tsdr | Id Num High | Id Num Low | Usr_Prm_Data |
|---|---|---|---|---|---|---|

Structure of the Set_Slave_Add telegram:

| Rem Add | New Slave Add | Id Num High | Id Num Low | No_Add_Chg | Usr_Prm_Data |
|---|---|---|---|---|---|

The Usr_Prm_Datas have the following structure.

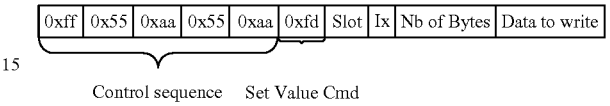

| 0xff | 0x55 | 0xaa | 0x55 | 0xaa | 0xfd | Slot | Ix | Nb of Bytes | Data to write |
|---|---|---|---|---|---|---|---|---|---|

Control sequence — Set Value Cmd

In the section Usr_Prm_Data of each service, the required information for changing parameters is coded. The first section of the telegram contains a control sequence, which serves as a supplemental safety mechanism. Thereafter comes, in a further section, the command to be executed. Currently, only the write command is supported. The following section includes details concerning the parameter that is to be changed, such as Slot/Index, number of bytes to be written, and the data to be written. After complete receipt of one of these telegrams, the corresponding write action is carried out in the affected field device, e.g. F1.

In the case of Set_Prm, the bytes from "Station Status" to "Id Num Low", i.e. the first 6 bytes, which are specific to the standard, are ignored.

| Station Status | WD_Fact 1 | WD_Fact 2 | Min_Tsdr | Id Num High | Id Num Low | Usr_Prm_Data |
|---|---|---|---|---|---|---|

In both cases, Set_Prm and Set_Slave_Add, only the contents of Usr_Prm_Data are evaluated.

Also with the cyclic services Set_Slave_Add and Set_Prm, thus, parameter values can be changed in field devices.

With the method of the invention, it is possible to change parameter values in the field device from a control unit, independently of the current state of a field device, wherein the control unit works basically as usual and does not need to make use of acyclic services.

The invention claimed is:

1. A method for parametering a field device of process automation technology, wherein the field device includes an Analog-Output-block and a Digital-Output-block, and is connected with a control unit via a bus system and exchanges telegrams with the control unit in cyclic data traffic, the cyclic data traffic normally serves for reading or writing process data in the field device without address specification, the method comprising the steps of:
   implementing an acyclic data communication with the help of cyclic data communication by way of packaging address value and associated parameter value into at least one telegram of a cyclic service in the control unit;

transmitting the one or more telegram(s) to the field device;
ascertaining the address value and the associated parameter value from the one or more telegram(s) received in the field device;
using the Analog-Output-block and a Digital-Output-block in the field device to mimic the acyclic write access, wherein necessary information and address of the parameter are coded in the Analog-Output-block and relevant services can be initiated by using defined control sequences via the Digital-Output-block; and
writing the parameter value to a memory address specified by the address value in the field device.

2. The method as claimed in claim 1, wherein:
address value and parameter value are transmitted in separate telegrams.

3. The method as claimed in claim 2, wherein:
the telegrams contain process data, which initiate services in the field device.

4. The method as claimed in claim 3, wherein:
the address value is a slot and index identification.

5. The method as claimed in claim 4, wherein:
provided in the field device are an analog-out module and a digital-out module, which are written in cyclic data traffic without address specification.

6. The method as claimed in claim 3, wherein:
a first section of the telegram, which contains at least the address of the parameter value provided for changing, is defined for the analog-out module.

7. The method as claimed in claim 3, wherein:
a second section of the telegram is for the digital-out module and contains information with reference to the first section.

8. The method as claimed in claim 1, wherein:
the new parameter value is divided byte-wise among at least a first telegram and a second telegram and at least a third telegram is transmitted in cyclic data traffic from the control unit to the field device; and
the third telegram contains, in a first section, another part of the parameter value.

9. The method as claimed in claim 1, wherein:
the bus system corresponds to the Profibus standard.

10. The method as claimed in claim 1, wherein:
the cyclic service is a configuring service.

11. The method as claimed in claim 10, wherein:
the configuring service corresponds to a Profibus service, Set_Slave_Add or Set_Prm.

12. The method as claimed in claim 1, wherein:
first the address value (slot and index) of the parameter to be changed is packaged in a telegram of cyclic data traffic (e.g. AO-block) with which a process datum is written and the AO-block is written with the relevant values.

13. The method as claimed in claim 1, wherein:
following successful configuration the state "Data Exchange" is reached and after all field devices (F1, F2, F3) are in the state "Data Exchange" they can exchange data cyclically with the control unit (PLC).

14. The method as claimed in claim 1, wherein:
normally in cyclic data traffic process data is read out of the field device or written into the field device as the case may be, and both accesses occur without address information for the relevant data values.

15. The method as claimed in claim 1, wherein:
the service defined in the Analog-Output-block is initiated in the field device by predefined control sequences in the Digital-Output-block.

\* \* \* \* \*